Inventor:
Hershel B. Duncan,
by Harry E. Dunham
His Attorney.

Inventor:
Hershel B. Duncan,
by Harry E. Dunham
His Attorney.

Patented Feb. 12, 1946

2,394,671

UNITED STATES PATENT OFFICE 2,394,671

PROFILE GRINDING MACHINE

Hershel B. Duncan, Detroit, Mich., assignor to Carboloy Company, Inc., a corporation of New York Application October 3, 1944, Serial No. 556,944

10 Claims. (Cl. 51—100)

The present invention is a profile grinding machine for producing shaped articles such as cones, tool tips, balls, and various other contours.

It is one of the objects of the present invention to provide a machine capable of producing various shaped articles from compacted comminuted material. It is a further object of the invention to provide a machine which is capable of producing various shaped articles efficiently and economically. Other objects will appear hereinafter.

In carrying out the present invention I employ a template having the outline or contour desired in the finished product. The template may be made of ply wood or other suitable material and should be considerably larger, for example about fifteen times the size of the finished product. A vertically movable ball-bearing roller is maintained in contact with and follows the template contour as the template is moved in a horizontal direction under the roller. The longitudinal or horizontal movement of the template is transmitted through reduction gearing to a follower head which moves at a far slower rate, for example fifteen times slower than the movement of a template having the above indicated size. The ball bearing roller is connected through reduction gearing to the follower head which has a vertical movement equal for example to one-fifteenth that of the roller. A thin rotary cutting or grinding disk, underneath which the follower head moves in horizontal and vertical directions, cuts the desired contour on the pressed powder article to be shaped.

Figure 1:
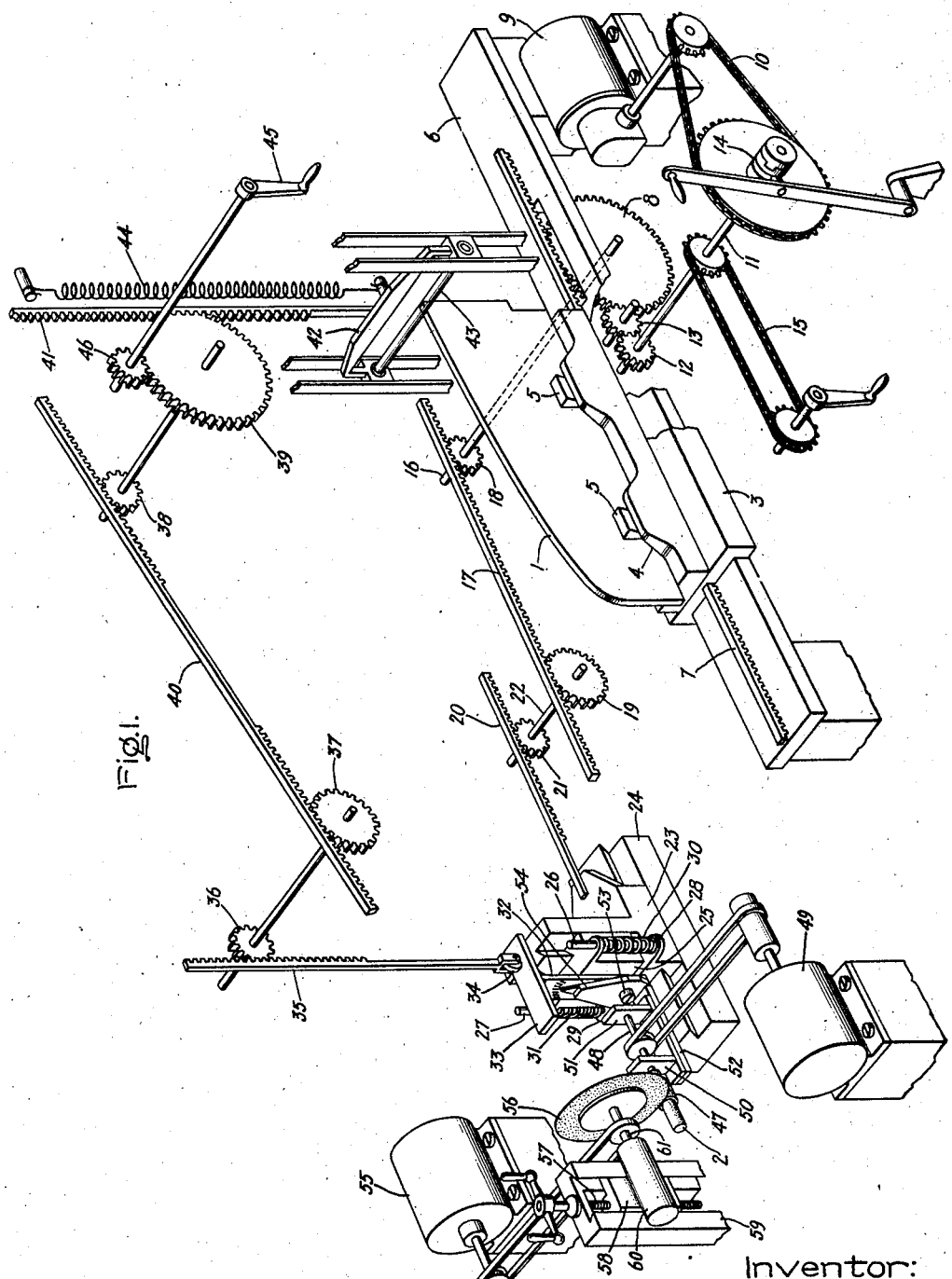
Figure 2:
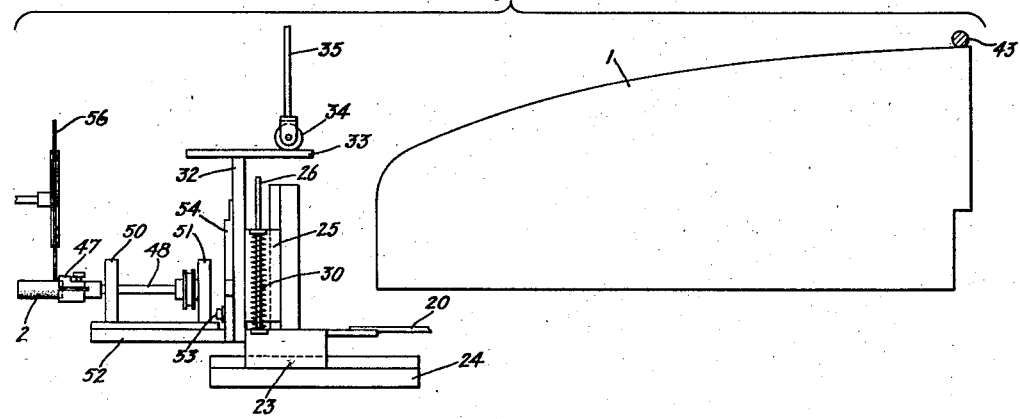
Figure 3:
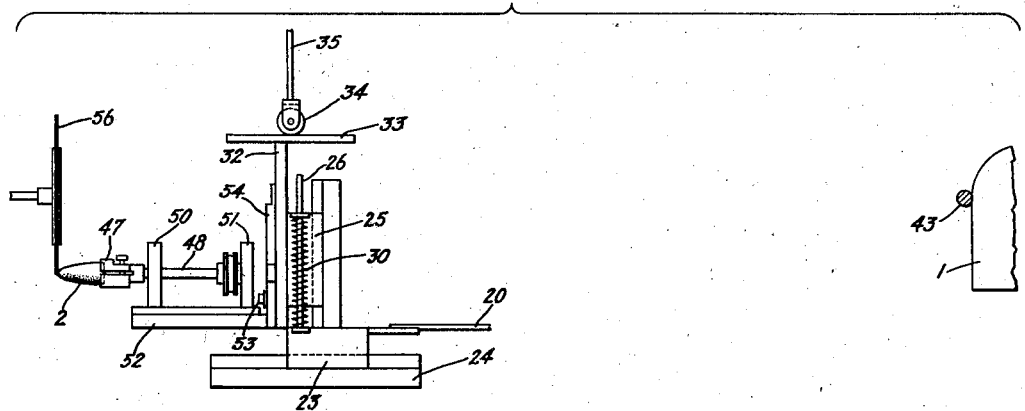
Figure 4:
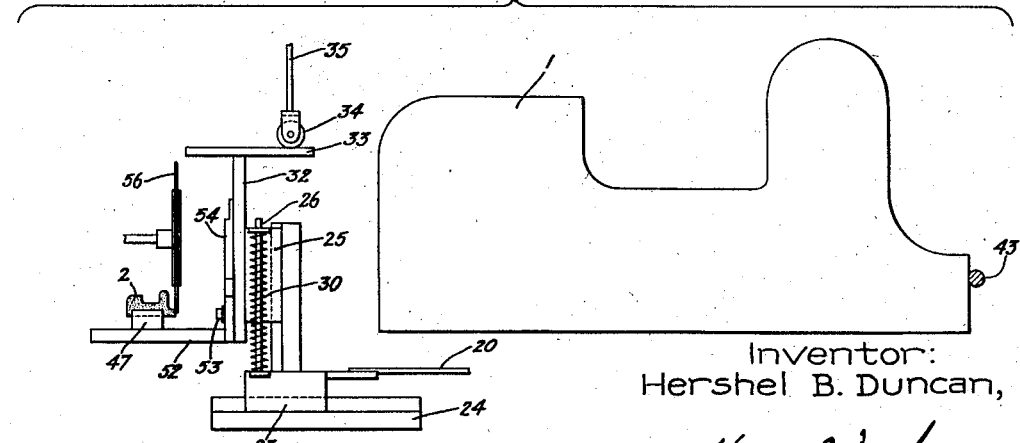

The novel features which are characteristic of my invention are set forth with particularity in the appended claims. My invention itself, however, will best be understood from reference to the following specification when considered in connection with the accompanying drawings in which Fig. 1 shows diagrammatically and in perspective a profile grinding machine embodying the features of my invention; Fig. 2 is a vertical elevation of one form of template and the cutting portion of the apparatus at the start of the shaping operation; Fig. 3 is a vertical elevation of the same apparatus at the end of the shaping operation; while Fig. 4 is an elevation of a template and the grinding apparatus for producing one form of contour on a flat or non-cylindrical object.

Referring more particularly to the drawings, I have indicated at 1 a ply wood template having a contour which is desired to be reproduced in a pressed powder article 2. The template is mounted in a holder or support 3 which has a groove 4 in which the template is positioned. Shims 5 may be inserted in the groove to hold the template rigidly in position. The supporting member 3 has the shape of an inverted channel and is longitudinally moveable on a table 6. To effect such movement of the template 1 and its channel support 3, the latter is provided with a rack 7 on its inner surface. Rack 7 is engaged by a gear 8 which is driven by a motor 9 through reduction gearing comprising a chain drive 10, shaft 11 and gears 12 and 13. The motor 9 may be connected to and disconnected from shaft 11 by a manually operable clutch 14. Shaft 11 also may be manually operated through a chain drive 15.

The article 2 to be shaped consists of pressed powder ingredients and, in the arrangement indicated, is moved in a horizontal direction simultaneously with and at one-fifteenth the speed of the member 3 and template 1. The horizontal movement of the article 2 is effected by reduction gearing comprising shaft 16 to which gear 8 is rigidly secured, rack 17 engaging gears 18 and 19 and rack 20 engaging gear 21 on shaft 22 and rigidly secured to a horizontally slidable member 23 to which the article 2 to be shaped is secured.

The slidable member 23 has a horizontal, dovetailed portion engaging a cooperating stationary supporting member 24. The member 23 is also provided with an integral, vertical, dovetailed extension which cooperates with a vertically slidable dovetailed member 25. The latter is provided at its upper end with oppositely disposed ears which are pierced to slidably accommodate steel pins 26 and 27 rigidly secured to projections 28 and 29 respectively which are integral with the horizontally slidable member 23. Coiled springs 30 and 31 surround pins 26 and 27 respectively and are under compression and tend to move the slidable member 25 in an upward direction.

A plate 32 is rigidly secured to and vertically movable with the member 25. Plate 32 also is rigidly secured at its upper end to a horizontally positioned plate 33. A roller 34 mounted on the end of a vertical rack 35, is connected through reduction gearing comprising gears 36, 37, 38, 39 and rack 40 with a vertically movable rack 41 rigidly attached to a frame 42 which carries a roller 43. A coiled spring 44 exerts tension in an upward direction on the roller 43 but the roller is held in contact with the template 1 by means of pressure applied to the plate 33 by springs 30, 31 and transmitted to the rack 41 through reduction gearing including gears 36, 37, 38 and 39 and racks 35 and 40. In order to position the roller 43 onto the template and to control its operation at the end of a stroke manually operable means is provided comprising a hand crank 45 which is connected to gear 46 engaging the gear 39.

The article 2 to be shaped comprises a pressed powder which, for purposes of illustration, may be a mixture of cemented carbide ingredients, for example a mixture of one or more hard metal carbides, such as tungsten carbide, molybdenum carbide, titanium carbide, tantalum carbide and the like with a metallic binder, for example cobalt. The article 2, which is highly compressed so that it may be handled without breakage, is mounted in a chuck 47 secured to a shaft 48 which is driven by an electric motor 49. Shaft 48 is mounted in bearings 50 and 51 carried by an angularly adjustable support or follower head 52. The latter is rigidly secured to a plate 54 extending at right angles to the support 52 and carrying a pointer cooperating with a scale on the plate 32. A screw 53 engages plate 32 and slidable member 25 and holds members 52 and 54 in any adjusted position.

A motor 55 drives a thin grinding disk 56 which effects removal of material from the article 2. The grinding disk may be adjusted vertically by means of a screw 57 which engages the vertically movable dovetailed member 58. The member 58 engages a cooperating stationary dovetailed member 59 and has an integral attachment 60 which provides a bearing for shaft 61 on which the cutting disk 56 is mounted. However, if desired the grinding disk may be maintained in a fixed vertical position and the article 2 moved to the desired initial vertical position by disconnecting gear 38 and rack 40 and then manually operating rack 40 to thereby effect movement of article 2.

If it is desired to form a conical article 2, a template such as illustrated at 1 in Figs. 1 and 2 is employed. This template preferably will have a size about fifteen times the size of the article to be formed and any horizontal movement of the template or variation of the position of the roller 43 thereon will be accompanied by a horizontal and vertical movement of the follower head carrying the article 2. When the template is fifteen times the size of the article to be formed, the extent of such movements of the follower head will be one-fifteenth of the horizontal movement of the template and one-fifteenth of the vertical movement of the roller 43.

In operation, the template is positioned in the holder 3 and moved to operative position on table 6 by the manually operable chain drive 15. Roller 43 is then adjusted to the position indicated in Figs. 1 and 2 by the hand crank 45 and reduction gearing 46, 39 and rack 41. Owing to the connection between the roller 43 and follower 52 the article 2 to be shaped will now occupy a vertical position directly under and in contact with the grinding wheel 56. Also, due to the reduction gear connection between the movable support 3, the article 2 will occupy the horizontal position indicated in Figs. 1 and 2.

After the motors 49 and 55 have been started, the clutch 14 is operated to connect motor 9 to the shaft 11 and thereby drive the holder 3 and template 1 in a forward horizontal direction. At the same time the slidable member 23 and follower head 52 will be moved in the same horizontal direction as template 1 but at one-fifteenth the speed of the template due to the reduction gearing between the support 3 and slidable member 23.

As the template 1 is moved in a forward direction, the roller 43 follows the contour of the template and is held in contact therewith by means of pressure exerted through springs 30 and 31 on the member 25 and plates 32 and 33. As the latter plate is move upwardly it operates rack 35 and through reduction gearing holds roller 43 in close contact with the contour of the template 1. As the template moves in a forward direction any downward movement of the roller 43 is accompanied by an upward movement of the plate 33 and follower head 52 carrying the article to be shaped. The extent of upward movement of the follower will be one-fifteenth the extent of the downward movement of the roller 43. As the article 2 is rotated and moved horizontally and vertically upward, the grinding wheel 56 effects the desired removal of material from the article.

At the end of the forward movement of the template the article 2 will be in the position and have the shape indicated in Fig. 3 of the drawings. At this time the motor 9 may be disconnected from shaft 11 and the support 3 returned by means of the manually operable chain drive 15 to substantially the position indicated in Fig. 1. If the roller 43 is then moved downwardly in front of and substantially in contact with the end of the template 1 the article 2 will be moved vertically upward and severed from its support by the grinding wheel 56.

If the article to be shaped is flat such as a tool tip or other non-cylindrical device, the motor 49 and driving shaft 48 may be omitted and the article positioned in a holder 47 which may be moved only in a horizontal and vertical direction. A template of this character and the position of the grinding wheel and template after the article has been formed and at the time it is desired to cut off the end portion of the article are indicated in Fig. 4 of the drawings. When a template such as illustrated in Fig. 4 is employed, the roller 43 is moved downward by means of the hand crank 45 otherwise the operation in cutting a flat piece of work is identical with the operation described in connection with the formation of conical or round articles.

What I claim as new and desire to secure by Letters Patent of the United States, is:

1. A machine comprising a template having the contour desired in an article to be shaped, a follower head adapted to support said article, means for simultaneously moving said template and head in a horizontal direction, the extent of the horizontal movement of said head being a certain fraction of the horizontal movement of said template, means for automatically moving said head in a vertical direction in response and proportional to changes in the contour of said template, and means for removing material from the article to be shaped as said article is moved thereunder.

2. A grinding machine comprising a template having the contour desired in an article to be shaped, a follower head adapted to support said article, means for moving said template in a horizontal direction, reduction gearing connecting said template and head whereby the extent of horizontal movement of said head is a certain fraction of the horizontal movement of said template, and means comprising reduction gearing for controlling the vertical movement of said head in accordance with changes in the contour of said template.

3. A grinding machine comprising a template having the contour desired in an article to be shaped, means for moving said template in a horizontal direction, a follower head adapted to support said article, reduction gearing for moving said head in a horizontal direction at a lower rate than the movement of said template, reduction gearing operable in response to variations in the surface of said template for effecting vertical movement of said head, and means adjacent said support for removing material from said article in accordance with variations in the movement of said head.

4. A grinding machine comprising a template having the contour desired in an article to be shaped, means for moving said template in a horizontal direction, a follower head adapted to support said article, reduction gearing connecting said head and template whereby said head is moved in a horizontal direction at a reduced speed, spring means for moving said head in an upward direction, and means comprising reduction gearing for operating said head in a downward direction in response to changes in the contour of said template.

5. A grinding machine comprising a template having the contour desired in an article to be shaped, means for moving said template in a horizontal direction, a follower head adapted to support said article, reduction gearing connecting said head and template whereby said head is moved in a horizontal direction at a reduced speed, spring means for moving said head in an upward direction, and means comprising reduction gearing for operating said head in a downward direction in response to changes in the contour of said template and means for rotating said article.

6. A grinding machine comprising a template having the contour desired in an article to be shaped, means for moving said template in a horizontal direction, a follower head, gearing for moving said head in a horizontal direction at a reduced speed, spring means for moving said head in an upward direction, and means comprising reduction gearing for operating said head in a downward direction in response to changes in the contour of said template, a chuck on said head for supporting said article to be shaped, and means for adjusting said chuck in a radial direction.

7. A grinding machine comprising a template having the contour desired in an article to be shaped, means for moving said template in a horizontal direction and for communicating said movement at a reduced rate to a follower head which is adapted to support said article to be shaped, spring biased means in contact with the surface of said template and connected to said head through reduction gearing whereby any variation in the contour of said template is accompanied by a corresponding movement of said article but on a reduced scale and spring means for maintaining said spring biased means in contact with said template.

8. A grinding machine comprising a template having the contour desired in an article to be shaped, a follower head adapted to support said article, said template being about fifteen times the size of said article, means comprising gearing for simultaneously moving the template and head in a horizontal direction, the extent of horizontal movement of said head being about one-fifteenth of the horizontal movement of said template, a spring biased member in contact with the contour of said template and adapted to move or permit movement of said head in a vertical direction in accordance with changes in the contour of said template, the extent of vertical movement of said head being about one-fifteenth of the vertical movement of said spring biased member, and grinding means for removing material from said article to be shaped as said article is moved thereunder.

9. A machine comprising a template having the contour desired in an article to be shaped, a follower head adapted to support said article, means for simultaneously moving said template and head in a horizontal direction, the extent of the horizontal movement of said head being a certain fraction of the horizontal movement of said template, means for moving said head in a vertical direction in response and proportion to changes in the contour of said template, means simultaneously rotating the article to be shaped, and means for shaping said article in response to movement of the same.

10. A machine comprising a template having the contour desired in an article to be shaped, a follower head adapted to support said article, means for simultaneously moving said template and head in a horizontal direction the extent of the horizontal movement of said head being a certain fraction of the horizontal movement of said template, means for moving said head in a vertical direction in response and proportional to changes in the contour of said template, and a grinding wheel positioned adjacent said article to be shaped and adapted to remove material therefrom in response to movement of said article.

HERSHEL B. DUNCAN.